(12) United States Patent
Rihn et al.

(10) Patent No.: US 9,513,748 B2
(45) Date of Patent: Dec. 6, 2016

(54) COMBINED DISPLAY PANEL CIRCUIT

(71) Applicant: Microsoft Technology Licensing, LLC, Redmond, WA (US)

(72) Inventors: Bernard K. Rihn, Snohomish, WA (US); Jeremy A. Jacobson, Seattle, WA (US); Paul Henry Dietz, Redmond, WA (US); Steven Nabil Bathiche, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 13/714,401

(22) Filed: Dec. 13, 2012

(65) Prior Publication Data

US 2014/0168131 A1    Jun. 19, 2014

(51) Int. Cl.
*G06F 3/044* (2006.01)
*G06F 3/041* (2006.01)

(52) U.S. Cl.
CPC .............. *G06F 3/044* (2013.01); *G06F 3/0412* (2013.01)

(58) Field of Classification Search
CPC .............. G09G 3/344; G09G 3/3651; G09G 2300/0473; G09G 2300/0482; G09G 2300/0486; G06F 3/0412; G06F 3/044
USPC .......................... 345/76, 156, 157, 173–178
See application file for complete search history.

(56) References Cited

U.S. PATENT DOCUMENTS

| | | |
|---|---|---|
| 4,046,975 A | 9/1977 | Seeger, Jr. |
| 4,065,649 A | 12/1977 | Carter et al. |
| 4,239,338 A | 12/1980 | Borrelli et al. |
| 4,243,861 A | 1/1981 | Strandwitz |
| 4,302,648 A | 11/1981 | Sado et al. |
| 4,317,013 A | 2/1982 | Larson |

(Continued)

FOREIGN PATENT DOCUMENTS

| | | |
|---|---|---|
| CN | 1352767 | 6/2002 |
| CN | 1440513 | 9/2003 |

(Continued)

OTHER PUBLICATIONS

"International Search Report and Written Opinion", Application No. PCT/US2013/051421, Dec. 6, 2013, 10 pages.

(Continued)

*Primary Examiner* — Charles Hicks
(74) *Attorney, Agent, or Firm* — Brandon Roper; Judy Yee; Micky Minhas

(57) ABSTRACT

Combined display panel circuit techniques are described herein. In one or more implementations, a combined panel circuit of a display device is configured to enable functionality for both recognition of touch inputs and functionality to update images output by the display device. The combined panel circuit, for instance, may include an electrode arrangement in conductive layers that sandwiches display particles used to form images for the display device. The display particles may be manipulated under the influence of a threshold voltage applied to the electrode arrangement that is sufficient to cause the display particles to transition between states. Capacitance sensing indicative of touch inputs may occur under the influence of a different voltage that is not sufficient to manipulate the display particles. The different voltages are selectively applied at different times to update displayed images through manipulation of the display particles and sense capacitance to recognize touch inputs.

20 Claims, 7 Drawing Sheets

(56) References Cited

U.S. PATENT DOCUMENTS

| | | |
|---|---|---|
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,576,436 A | 3/1986 | Daniel |
| 4,588,187 A | 5/1986 | Dell |
| 4,607,147 A | 8/1986 | Ono et al. |
| 4,615,579 A | 10/1986 | Whitehead |
| 4,651,133 A | 3/1987 | Ganesan et al. |
| 5,220,521 A | 6/1993 | Kikinis |
| 5,283,559 A | 2/1994 | Kalendra et al. |
| 5,331,443 A | 7/1994 | Stanisci |
| 5,339,382 A | 8/1994 | Whitehead |
| 5,406,415 A | 4/1995 | Kelly |
| 5,548,477 A | 8/1996 | Kumar et al. |
| 5,558,577 A | 9/1996 | Kato |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,861,990 A | 1/1999 | Tedesco |
| 5,874,697 A | 2/1999 | Selker et al. |
| 5,926,170 A | 7/1999 | Oba |
| 5,971,635 A | 10/1999 | Wise |
| 5,999,147 A | 12/1999 | Teitel |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,046,857 A | 4/2000 | Morishima |
| 6,061,644 A | 5/2000 | Leis |
| 6,178,443 B1 | 1/2001 | Lin |
| 6,195,136 B1 | 2/2001 | Handschy et al. |
| 6,232,934 B1 | 5/2001 | Heacock et al. |
| 6,238,078 B1 | 5/2001 | Hed |
| 6,254,105 B1 | 7/2001 | Rinde et al. |
| 6,279,060 B1 | 8/2001 | Luke et al. |
| 6,300,986 B1 | 10/2001 | Travis |
| 6,329,617 B1 | 12/2001 | Burgess |
| 6,342,871 B1 | 1/2002 | Takeyama |
| 6,344,791 B1 | 2/2002 | Armstrong |
| 6,353,503 B1 | 3/2002 | Spitzer et al. |
| 6,362,861 B1 | 3/2002 | Hertz et al. |
| 6,380,497 B1 | 4/2002 | Hashimoto et al. |
| 6,437,682 B1 | 8/2002 | Vance |
| 6,469,755 B1 | 10/2002 | Adachi et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,600,121 B1 | 7/2003 | Olodort et al. |
| 6,603,408 B1 | 8/2003 | Gaba |
| 6,617,536 B2 | 9/2003 | Kawaguchi |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,795,146 B2 | 9/2004 | Dozov et al. |
| 6,813,143 B2 | 11/2004 | Makela |
| 6,819,316 B2 | 11/2004 | Schulz et al. |
| 6,833,955 B2 | 12/2004 | Niv |
| 6,847,488 B2 | 1/2005 | Travis |
| 6,856,506 B2 | 2/2005 | Doherty et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,007,238 B2 | 2/2006 | Glaser |
| 7,025,908 B1 | 4/2006 | Hayashi et al. |
| 7,051,149 B2 | 5/2006 | Wang et al. |
| 7,058,252 B2 | 6/2006 | Woodgate et al. |
| 7,066,634 B2 | 6/2006 | Kitamura et al. |
| 7,091,436 B2 | 8/2006 | Serban |
| 7,101,048 B2 | 9/2006 | Travis |
| 7,106,222 B2 | 9/2006 | Ward et al. |
| 7,123,292 B1 | 10/2006 | Seeger et al. |
| 7,152,985 B2 | 12/2006 | Benitez et al. |
| 7,194,662 B2 | 3/2007 | Do et al. |
| 7,199,931 B2 | 4/2007 | Boettiger et al. |
| 7,213,991 B2 | 5/2007 | Chapman et al. |
| 7,218,830 B2 | 5/2007 | Iimura |
| 7,277,087 B2 | 10/2007 | Hill et al. |
| 7,400,805 B2 | 7/2008 | Abu-Ageel |
| 7,447,934 B2 | 11/2008 | Dasari et al. |
| 7,469,386 B2 | 12/2008 | Bear et al. |
| 7,481,566 B2 | 1/2009 | Han |
| 7,499,037 B2 | 3/2009 | Lube |
| 7,499,216 B2 | 3/2009 | Niv et al. |
| 7,502,803 B2 | 3/2009 | Culter et al. |
| 7,515,143 B2 | 4/2009 | Keam et al. |
| 7,542,052 B2 | 6/2009 | Solomon et al. |
| 7,558,594 B2 | 7/2009 | Wilson |
| 7,559,834 B1 | 7/2009 | York |
| 7,561,131 B2 | 7/2009 | Ijzerman et al. |
| 7,636,921 B2 | 12/2009 | Louie |
| 7,643,213 B2 | 1/2010 | Boettiger et al. |
| 7,656,392 B2 | 2/2010 | Bolender |
| 7,733,326 B1 | 6/2010 | Adiseshan |
| 7,777,972 B1 | 8/2010 | Chen et al. |
| 7,782,342 B2 | 8/2010 | Koh |
| 7,800,708 B2 | 9/2010 | Brott et al. |
| 7,813,715 B2 | 10/2010 | McKillop et al. |
| 7,855,716 B2 | 12/2010 | McCreary et al. |
| 7,884,807 B2 | 2/2011 | Hovden et al. |
| D636,397 S | 4/2011 | Green |
| 7,918,559 B2 | 4/2011 | Tesar |
| 7,928,964 B2 | 4/2011 | Kolmykov-Zotov et al. |
| 7,945,717 B2 | 5/2011 | Rivalsi |
| 7,967,462 B2 | 6/2011 | Ogiro et al. |
| 7,973,771 B2 | 7/2011 | Geaghan |
| 7,978,281 B2 | 7/2011 | Vergith et al. |
| 8,035,614 B2 | 10/2011 | Bell et al. |
| 8,035,624 B2 | 10/2011 | Bell et al. |
| 8,053,688 B2 | 11/2011 | Conzola et al. |
| 8,065,624 B2 | 11/2011 | Morin et al. |
| 8,069,356 B2 | 11/2011 | Rathi et al. |
| RE42,992 E | 12/2011 | David |
| 8,102,362 B2 | 1/2012 | Ricks et al. |
| 8,115,718 B2 | 2/2012 | Chen et al. |
| 8,130,203 B2 | 3/2012 | Westerman |
| 8,154,524 B2 | 4/2012 | Wilson et al. |
| D659,139 S | 5/2012 | Gengler |
| 8,169,421 B2 | 5/2012 | Wright et al. |
| 8,220,929 B2 | 7/2012 | Miyawaki et al. |
| 8,229,509 B2 | 7/2012 | Paek et al. |
| 8,229,522 B2 | 7/2012 | Kim et al. |
| 8,243,027 B2 * | 8/2012 | Hotelling et al. ............ 345/173 |
| 8,249,263 B2 | 8/2012 | Cragun |
| 8,310,768 B2 | 11/2012 | Lin et al. |
| 8,345,920 B2 | 1/2013 | Ferren et al. |
| 8,416,206 B2 | 4/2013 | Carpendale et al. |
| 8,466,902 B2 | 6/2013 | Boer et al. |
| 8,582,206 B2 | 11/2013 | Travis |
| 8,717,664 B2 * | 5/2014 | Wang et al. .................. 359/296 |
| 8,749,529 B2 | 6/2014 | Powell et al. |
| 9,019,615 B2 | 4/2015 | Travis |
| 9,052,414 B2 | 6/2015 | Travis et al. |
| 9,152,173 B2 | 10/2015 | Lee et al. |
| 9,355,345 B2 | 5/2016 | Powell |
| 2002/0134828 A1 | 9/2002 | Sandbach et al. |
| 2003/0165017 A1 | 9/2003 | Amitai |
| 2003/0197687 A1 | 10/2003 | Shetter |
| 2004/0052506 A1 | 3/2004 | Togino |
| 2004/0174709 A1 | 9/2004 | Buelow, II et al. |
| 2004/0258924 A1 | 12/2004 | Berger et al. |
| 2004/0268000 A1 | 12/2004 | Barker et al. |

(56) References Cited

U.S. PATENT DOCUMENTS

| | | |
|---|---|---|
| 2005/0001957 A1 | 1/2005 | Amimori et al. |
| 2005/0002073 A1 | 1/2005 | Nakamura et al. |
| 2005/0057515 A1 | 3/2005 | Bathiche |
| 2005/0059489 A1 | 3/2005 | Kim |
| 2005/0073756 A1 | 4/2005 | Poulsen |
| 2005/0084212 A1 | 4/2005 | Fein |
| 2005/0100690 A1 | 5/2005 | Mayer et al. |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2006/0002101 A1 | 1/2006 | Wheatley et al. |
| 2006/0028400 A1 | 2/2006 | Lapstun et al. |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0195522 A1 | 8/2006 | Miyazaki |
| 2006/0227393 A1 | 10/2006 | Herloski |
| 2006/0238550 A1 | 10/2006 | Page |
| 2006/0239006 A1 | 10/2006 | Chaves et al. |
| 2006/0279501 A1 | 12/2006 | Lu et al. |
| 2007/0002587 A1 | 1/2007 | Miyashita |
| 2007/0047260 A1 | 3/2007 | Lee et al. |
| 2007/0062089 A1 | 3/2007 | Homer et al. |
| 2007/0072474 A1 | 3/2007 | Beasley et al. |
| 2007/0126994 A1 | 6/2007 | Hwang |
| 2007/0153545 A1 | 7/2007 | Lee |
| 2007/0182663 A1 | 8/2007 | Biech |
| 2007/0189667 A1 | 8/2007 | Wakita et al. |
| 2007/0234420 A1 | 10/2007 | Novotney et al. |
| 2007/0236408 A1 | 10/2007 | Yamaguchi et al. |
| 2007/0247432 A1 | 10/2007 | Oakley |
| 2007/0260892 A1 | 11/2007 | Paul et al. |
| 2007/0279744 A1 | 12/2007 | Fujimoto |
| 2007/0283179 A1 | 12/2007 | Burnett et al. |
| 2008/0005423 A1 | 1/2008 | Jacobs et al. |
| 2008/0080166 A1 | 4/2008 | Duong et al. |
| 2008/0088593 A1 | 4/2008 | Smoot |
| 2008/0094398 A1 | 4/2008 | Ng et al. |
| 2008/0104437 A1 | 5/2008 | Lee |
| 2008/0122803 A1 | 5/2008 | Izadi et al. |
| 2008/0150913 A1 | 6/2008 | Bell et al. |
| 2008/0151478 A1 | 6/2008 | Chern |
| 2008/0158185 A1 | 7/2008 | Westerman |
| 2008/0179507 A2 | 7/2008 | Han |
| 2008/0225205 A1 | 9/2008 | Travis |
| 2008/0238871 A1* | 10/2008 | Tam .................. G02F 1/1533 345/158 |
| 2008/0238884 A1 | 10/2008 | Harish |
| 2008/0253822 A1 | 10/2008 | Matias |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0033623 A1 | 2/2009 | Lin |
| 2009/0067156 A1 | 3/2009 | Bonnett et al. |
| 2009/0073957 A1 | 3/2009 | Newland et al. |
| 2009/0096738 A1 | 4/2009 | Chen et al. |
| 2009/0140985 A1 | 6/2009 | Liu |
| 2009/0142020 A1 | 6/2009 | Van Ostrand et al. |
| 2009/0167718 A1* | 7/2009 | Lee .................. G06F 3/044 345/174 |
| 2009/0189974 A1 | 7/2009 | Deering |
| 2009/0200384 A1 | 8/2009 | Masalkar |
| 2009/0251008 A1 | 10/2009 | Sugaya |
| 2009/0262492 A1 | 10/2009 | Whitchurch et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy et al. |
| 2010/0051432 A1 | 3/2010 | Lin et al. |
| 2010/0053534 A1 | 3/2010 | Hsieh et al. |
| 2010/0053771 A1 | 3/2010 | Travis et al. |
| 2010/0072351 A1 | 3/2010 | Mahowald |
| 2010/0077237 A1 | 3/2010 | Sawyers |
| 2010/0085321 A1 | 4/2010 | Pundsack |
| 2010/0102206 A1 | 4/2010 | Cazaux et al. |
| 2010/0103112 A1 | 4/2010 | Yoo et al. |
| 2010/0149073 A1 | 6/2010 | Chaum et al. |
| 2010/0149100 A1 | 6/2010 | Meiby |
| 2010/0149111 A1 | 6/2010 | Olien |
| 2010/0149117 A1 | 6/2010 | Chien et al. |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0177388 A1 | 7/2010 | Cohen et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0214659 A1 | 8/2010 | Levola |
| 2010/0222110 A1 | 9/2010 | Kim et al. |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0282953 A1 | 11/2010 | Tam |
| 2010/0284085 A1 | 11/2010 | Laakkonen |
| 2010/0289457 A1 | 11/2010 | Onnerud et al. |
| 2010/0295812 A1 | 11/2010 | Burns et al. |
| 2010/0296163 A1 | 11/2010 | Saarikko |
| 2010/0302378 A1 | 12/2010 | Marks et al. |
| 2010/0302469 A1 | 12/2010 | Yue et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0325155 A1 | 12/2010 | Skinner et al. |
| 2011/0002577 A1 | 1/2011 | Van Ostrand |
| 2011/0007047 A1 | 1/2011 | Fujioka et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0032215 A1 | 2/2011 | Sirotich et al. |
| 2011/0035209 A1 | 2/2011 | Macfarlane |
| 2011/0037721 A1 | 2/2011 | Cranfill et al. |
| 2011/0043479 A1 | 2/2011 | Van Aerle et al. |
| 2011/0043990 A1 | 2/2011 | Mickey et al. |
| 2011/0044579 A1 | 2/2011 | Travis et al. |
| 2011/0060926 A1 | 3/2011 | Brooks et al. |
| 2011/0069148 A1 | 3/2011 | Jones et al. |
| 2011/0072391 A1 | 3/2011 | Hanggie et al. |
| 2011/0074688 A1 | 3/2011 | Hull et al. |
| 2011/0096035 A1 | 4/2011 | Shen |
| 2011/0102326 A1 | 5/2011 | Casparian et al. |
| 2011/0122071 A1 | 5/2011 | Powell |
| 2011/0134032 A1 | 6/2011 | Chiu et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169778 A1 | 7/2011 | Nungester et al. |
| 2011/0170289 A1 | 7/2011 | Allen et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0197156 A1 | 8/2011 | Strait et al. |
| 2011/0205372 A1 | 8/2011 | Miramontes |
| 2011/0216039 A1 | 9/2011 | Chen et al. |
| 2011/0227913 A1 | 9/2011 | Hyndman |
| 2011/0234535 A1 | 9/2011 | Hung et al. |
| 2011/0235179 A1 | 9/2011 | Simmonds |
| 2011/0242440 A1 | 10/2011 | Noma et al. |
| 2011/0242670 A1 | 10/2011 | Simmonds |
| 2011/0248920 A1 | 10/2011 | Larsen |
| 2011/0290686 A1 | 12/2011 | Huang |
| 2011/0291993 A1 | 12/2011 | Miyazaki |
| 2011/0297566 A1 | 12/2011 | Gallagher et al. |
| 2011/0304577 A1 | 12/2011 | Brown |
| 2011/0304815 A1 | 12/2011 | Newell |
| 2011/0316807 A1 | 12/2011 | Corrion |

(56) References Cited

U.S. PATENT DOCUMENTS

| | | |
|---|---|---|
| 2011/0317399 A1 | 12/2011 | Hsu |
| 2012/0007821 A1 | 1/2012 | Zaliva |
| 2012/0023459 A1 | 1/2012 | Westerman |
| 2012/0024682 A1* | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0062850 A1 | 3/2012 | Travis |
| 2012/0068919 A1 | 3/2012 | Lauder et al. |
| 2012/0075249 A1 | 3/2012 | Hoch |
| 2012/0075256 A1 | 3/2012 | Izadi et al. |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0102436 A1 | 4/2012 | Nurmi |
| 2012/0102438 A1 | 4/2012 | Robinson et al. |
| 2012/0113031 A1 | 5/2012 | Lee et al. |
| 2012/0113223 A1 | 5/2012 | Hilliges et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0146943 A1 | 6/2012 | Fairley et al. |
| 2012/0162088 A1* | 6/2012 | van Lieshout et al. ...... 345/173 |
| 2012/0162126 A1 | 6/2012 | Yuan et al. |
| 2012/0162693 A1 | 6/2012 | Ito |
| 2012/0170284 A1 | 7/2012 | Shedletsky |
| 2012/0182242 A1 | 7/2012 | Lindahl et al. |
| 2012/0182743 A1 | 7/2012 | Chou |
| 2012/0188243 A1 | 7/2012 | Fujii et al. |
| 2012/0194448 A1 | 8/2012 | Rothkopf |
| 2012/0195063 A1 | 8/2012 | Kim et al. |
| 2012/0200532 A1 | 8/2012 | Powell et al. |
| 2012/0224073 A1 | 9/2012 | Miyahara |
| 2012/0243102 A1 | 9/2012 | Takeda et al. |
| 2012/0243204 A1 | 9/2012 | Robinson |
| 2012/0246377 A1 | 9/2012 | Bhesania |
| 2012/0256959 A1 | 10/2012 | Ye et al. |
| 2012/0268912 A1 | 10/2012 | Minami et al. |
| 2012/0274811 A1 | 11/2012 | Bakin |
| 2012/0300275 A1 | 11/2012 | Vilardell et al. |
| 2013/0027354 A1 | 1/2013 | Yabuta et al. |
| 2013/0063873 A1 | 3/2013 | Wodrich et al. |
| 2013/0106813 A1 | 5/2013 | Hotelling et al. |
| 2013/0107572 A1 | 5/2013 | Holman et al. |
| 2013/0120760 A1 | 5/2013 | Raguin et al. |
| 2013/0181926 A1 | 7/2013 | Lim |
| 2013/0201094 A1 | 8/2013 | Travis |
| 2013/0207896 A1 | 8/2013 | Robinson et al. |
| 2013/0222353 A1 | 8/2013 | Large |
| 2013/0229357 A1 | 9/2013 | Powell |
| 2013/0265220 A1 | 10/2013 | Fleischmann et al. |
| 2013/0329301 A1 | 12/2013 | Travis |
| 2013/0332628 A1 | 12/2013 | Panay et al. |
| 2014/0022629 A1 | 1/2014 | Powell |
| 2014/0098085 A1 | 4/2014 | Lee et al. |
| 2014/0233237 A1 | 8/2014 | Lutian |
| 2014/0254032 A1 | 9/2014 | Chen |
| 2015/0177497 A1 | 6/2015 | Travis |

FOREIGN PATENT DOCUMENTS

| | | |
|---|---|---|
| CN | 102047155 | 5/2011 |
| CN | 102147643 | 8/2011 |
| EP | 0271956 | 6/1988 |
| EP | 2353978 | 8/2011 |
| EP | 2381290 | 10/2011 |
| EP | 2400365 | 12/2011 |
| JP | 10301055 | 11/1998 |
| JP | 10326124 | 12/1998 |
| JP | 2001174746 | 6/2001 |
| JP | 2009003053 | 1/2009 |
| JP | 2009122551 | 6/2009 |
| KR | 20110064265 | 6/2011 |
| WO | WO-9964784 | 12/1999 |
| WO | WO-0079327 | 12/2000 |
| WO | WO-2011016200 | 2/2011 |
| WO | WO-2012063410 | 5/2012 |

OTHER PUBLICATIONS

"International Search Report and Written Opinion", Application No. PCT/US2013/063156, Dec. 5, 2013, 9 pages.

"Notice of Allowance", U.S. Appl. No. 13/409,967, Feb. 14, 2014, 4 pages.

"Restriction Requirement", U.S. Appl. No. 13/494,722, Dec. 20, 2013, 6 pages.

"Accessing Device Sensors", retrieved from <https://developer.palm.com/content/api/dev-guide/pdk/accessing-device-sensors.html> on May 25, 2012, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 10 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, (Jan. 2013), 1 page.

"First One Handed Fabric Keyboard with Bluetooth Wireless Technology", Retrieved from: <http://press.xtvworld.com/article3817.html> on May 8, 2012,(Jan. 6, 2005), 2 pages.

"For Any Kind of Proceeding 2011 Springtime as Well as Coil Nailers as Well as Hotter Summer Season", *Lady Shoe Worlds*, retrieved from <http://www.ladyshoesworld.com/2011/09/18/for-any-kind-of-proceeding-2011-springtime-as-well-as-coil-nailers-as-well-as-hotter-summer-season/> on Nov. 3, 2011,(Sep. 8, 2011), 2 pages.

"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"International Search Report and Written Opinion", International Application No. PCT/US2011/050471, (Apr. 9, 2012), 8 pages.

"Membrane Keyboards & Membrane Keypads", Retrieved from: <http://www.pannam.com/> on May 9, 2012,(Mar. 4, 2009), 2 pages.

"Microsoft Develops Glasses-Free Eye-Tracking 3D Display",*Tech-FAQ*, retrieved from <http://www.tech-faq.com/microsoft-develops-glasses-free-eye-tracking-3d-display.html> on Nov. 2, 2011, 3 pages. .

"Microsoft Reveals Futuristic 3D Virtual HoloDesk Patent", Retrieved from <http://www.patentbolt.com/2012/05/microsoft-reveals-futuristic-3d-virtual-holodesk-patent.htmlt> on May 28, 2012, (May 23, 2012), 9 pages.

"Motion Sensors", *Android Developers*, retrieved from <http://developer.android.com/guide/topics/sensors/sensors_motion.html>on May 25, 2012, 7 pages.

"Non-Final Office Action", U.S. Appl. No. 12/882,994, (Feb. 1, 2013),17 pages.

"Non-Final Office Action", U.S. Appl. No. 13/471,001, (Feb. 19, 2013),15 pages.

"Non-Final Office Action", U.S. Appl. No. 13/471,139, (Mar. 21, 2013),12 pages.

"Non-Final Office Action", U.S. Appl. No. 13/471,202, (Feb. 11, 2013),10 pages.

"Non-Final Office Action", U.S. Appl. No. 13/471,336, (Jan. 18, 2013),14 pages.

"Non-Final Office Action", U.S. Appl. No. 13/651,195, (Jan. 2, 2013),14 pages.

"Non-Final Office Action", U.S. Appl. No. 13/651,232, (Jan. 17, 2013),15 pages.

(56) References Cited

OTHER PUBLICATIONS

"Non-Final Office Action", U.S. Appl. No. 13/651,272, (Feb. 12, 2013),10 pages.
"Non-Final Office Action", U.S. Appl. No. 13/651,287, (Jan. 29, 2013),13 pages.
"Non-Final Office Action", U.S. Appl. No. 13/651,304, (Mar. 22, 2013), 9 pages.
"Non-Final Office Action", U.S. Appl. No. 13/651,327, (Mar. 22, 2013), 6 pages.
"Non-Final Office Action", U.S. Appl. No. 13/651,871, (Mar. 18, 2013),14 pages.
"Non-Final Office Action", U.S. Appl. No. 13/651,976, (Feb. 22, 2013),16 pages.
"Non-Final Office Action", U.S. Appl. No. 13/653,321, (Feb. 1, 2013),13 pages.
"Non-Final Office Action", U.S. Appl. No. 13/653,682, (Feb. 7, 2013),11 pages.
"Notice of Allowance", U.S. Appl. No. 13/470,633, (Mar. 22, 2013), 7 pages.
"Position Sensors", *Android Developers*, retrieved from <http://developer.android.com/guide/topics/sensors/sensors_position.html> on May 25, 2012, 5 pages.
"Restriction Requirement", U.S. Appl. No. 13/471,139, (Jan. 17, 2013), 7 pages.
"Restriction Requirement", U.S. Appl. No. 13/651,304, (Jan. 18, 2013), 7 pages.
"Restriction Requirement", U.S. Appl. No. 13/651,726, (Feb. 22, 2013), 6 pages.
"Restriction Requirement", U.S. Appl. No. 13/651,871, (Feb. 7, 2013), 6 pages.
"SoIRxTM E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012,(2011), 4 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.
"Tilt Shift Lenses: Perspective Control", retrieved from http://www.cambridgeincolour.com/tutorials/tilt-shift-lenses1.htm, (Mar. 28, 2008),11 Pages.
"Virtualization Getting Started Guide", *Red Hat Enterprise Linux 6*, Edition 0.2, retrieved from <http://docs.redhat.com/docs/en-US/Red_Hat_Enterprise_Linux/6/html-single/Virtualization_Getting_Started_Guide/index.html> on Jun. 13, 2012, 24 pages.
"What is Active Alignment?", http://www.kasalis.com/active_alignment.html, retrieved on Nov. 22, 2012, 2 Pages.
Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011),14 pages.
Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.
Burge, et al., "Determination of off-axis aberrations of imaging systems using on-axis measurements", *SPIE Proceeding*, Retrieved from <http://www.loft.optics.arizona.edu/documents/journal_articles/Jim_Burge_Determination_of_off-axis_aberrations_of_imaging_systems_using_on-axis_measurements.pdf>,(Sep. 21, 2011),10 pages.
Butler, Alex et al., "SideSight: Multi-"touch" Interaction around Small Devices", *In the proceedings of the 21st annual ACM symposium on User interface software and technology.*,retrieved from <http://research.microsoft.com/pubs/132534/sidesight_crv3.pdf> on May 29, 2012,(Oct. 19, 2008), 4 pages.
Chang, Jee-Gong et al., "Optical Design and Analysis of LCD Backlight Units Using ASAP", *Optical Engineering*, Available at <http://www.opticsvalley.com/resources/kbasePDF/ma_oe_001_optical_design.pdf>,(Jun. 2003),15 pages.
Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.
Dietz, Paul H., et al., "A Practical Pressure Sensitive Computer Keyboard", In Proceedings of UIST 2009,(Oct. 2009), 4 pages.
Diverdi, et al., "An Immaterial Pseudo-3D Display with 3D Interaction", *In the proceedings of Three-Dimensional Television: Capture, Transmission, and Display, Springer*, Retrieved from <http://www.cs.ucsb.edu/~holl/pubs/DiVerdi-2007-3DTV.pdf>, (Feb. 6, 2007) 26 pages.
Glatt, Jeff "Channel and Key Pressure (Aftertouch).", Retrieved from: <http://home.roadrunner.com/~jgglatt/tutr/touch.htm> on Jun. 11, 2012, 2 pages.
Grossman, et al., "Multi-Finger Gestural Interaction with 3D Volumetric Displays", *In the proceedings of the 17th annual ACM symposium on User interface software and technology*, Retrieved from <http://www.dgp.toronto.edu/papers/tgrossman_UIST2004.pdf>,(Oct. 24, 2004), pp. 61-70.
Hanlon, Mike "ElekTex Smart Fabric Keyboard Goes Wireless", Retrieved from: <http://www.gizmag.com/go/5048/ > on May 7, 2012,(Jan. 15, 2006), 5 pages.
Izadi, Shahram et al., "ThinSight: A Thin Form-Factor Interactive Surface Technology", *Communications of the ACM*, vol. 52, No. 12, retrieved from <http://research.microsoft.com/pubs/132532/p90-izadi.pdf> on Jan. 5, 2012,(Dec. 2009), pp. 90-98.
Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.
Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.
Lee, C.M.G "Flat-Panel Autostereoscopic 3D Display", *Optoelectronics, IET*, Available at <http://ieeexplore.ieee.org/stamp/stamp.jsp?arnumber=04455550>,(Feb. 2008), pp. 24-28.
Lee, et al., "Depth-Fused 3D Imagery on an Immaterial Display", *In the proceedings of IEEE Transactions On Visualization and Computer Graphics*, vol. 15, No. 1, Retrieved from <http://ieeexplore.ieee.org/stamp/stamp.jsp?arnumber=04540094>,(Jan. 2009), pp. 20-33.
Lee, et al., "LED Light Coupler Design for a Ultra Thin Light Guide", *Journal of the Optical Society of Korea*, vol. 11, Issue.3, Retrieved from <http://opticslab.kongju.ac.kr/pdf/06.pdf>, (Sep. 2007), 5 pages.
Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
Liu, et al., "Three-dimensional PC: toward novel forms of human-computer interaction", *In the proceedings of Three-Dimensional Video and Display: Devices and Systems* vol. CR76, Retrieved from <http://www.google.co.in/url?sa=t&rct=j&q=Three-dimensional+PC:+toward+novel+forms+of+human-computer+interaction&source=web&cd=1&ved=0CFoQFjAA&url=http%3A%2F%2Fciteseerx.ist.psu.edu%2Fviewdoc%2Fdownload%3Fdoi%3D10.1.1.32.9469%26rep%3Drep1%26,(Nov. 5, 2000), pp. 250-281.
McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.
Peli, Eli "Visual and Optometric Issues with Head-Mounted Displays", *IS & T/OSA Optics & Imaging in the Information Age, The Society for Imaging Science and Technology*, available at <http://www.u.arizona.edu/~zrui3/zhang_pHMPD_spie07.pdf>,(1996), pp. 364-369.
Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/pa-

(56) References Cited

OTHER PUBLICATIONS tently-apple/2012/01/apple-is-paving-the-way-for-a-new-3d-gui-for-ios-devices.html> on Jun. 4, 2012,(Jan. 12, 2012),15 pages.
Reisman, et al., "A Screen-Space Formulation for 2D and 3D Direct Manipulation", *In the proceedings of the 22nd annual ACM symposium on User interface*, Retrieved from <http://innovis.cpsc.ucalgary.ca/innovis/uploads/Courses/TableTopDetails2009/Reisman2009.pdf>,(Oct. 4, 2009), pp. 69-78.
Schoning, Johannes et al., "Building Interactive Multi-Touch Surfaces", *Journal of Graphics, GPU, and Game Tools*, vol. 14, No. 3, available at <http://www.libavg.com/raw-attachment/wiki/Multitouch/Multitouchguide_draft.pdf>,(Nov. 2009), pp. 35-55.
Takamatsu, Seiichi et al., "Flexible Fabric Keyboard with Conductive Polymer-Coated Fibers", In Proceedings of Sensors 2011,(Oct. 28, 2011), 4 pages.
Travis, Adrian R., et al., "Flat Projection for 3-D", *In Proceedings of the IEEE*, vol. 94 Issue: 3, Available at <http://ieeexplore.ieee.org/stamp/stamp.jsp?tp=&arnumber=1605201>,(Mar. 2006), pp. 539-549.
Yan, Jin-Ren et al., "Edge-Lighting Light Guide Plate Based on Micro-Prism for Liquid Crystal Display", *Journal of Display Technology*, vol. 5, No. 9, Available at <http://ieeexplore.ieee.org/ielx5/9425/5196834/05196835.pdf?tp=&arnumber=5196835&isnumber=5196834>,(Sep. 2009), pp. 355-357.
Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.
Zhang, Rui "Design of Head Mounted Displays", Retrieved at <<http://www.optics.arizona.edu/optomech/student%20reports/2007/Design%20of%20mounteddisplays%20Zhang.pdf>>, (Dec. 12, 2007), 6 pages.
"Chinese Search Report", Application No. 201110272868.3, (Apr. 1, 2013),10 pages.
"Notice of Allowance", U.S. Appl. No. 12/882,994, (Jul. 12, 2013), 9 pages.
"PCT Search Report", Application No. PCT/US2013/042790, (Aug. 8, 2013), 9 pages.
"International Search Report and Written Opinion", Application No. PCT/US2013/042550, (Sep. 24, 2013),14 pages.
"Non-Final Office Action", U.S. Appl. No. 13/409,967, (Dec. 10, 2013), 5 pages.
"Non-Final Office Action", U.S. Appl. No. 13/408,257, (Dec. 5, 2013),13 pages.
"Welcome to Windows 7", Retrieved from: <http://www.microsoft.com/en-us/download/confirmation.aspx?id=4984> on Aug. 1, 2013, (Sep. 16, 2009), 3 pages.
Prospero, Michael "Samsung Outs Series 5 Hybrid PC Tablet", Retrieved from: <http://blog.laptopmag.com/samsung-outs-series-5-hybrid-pc-tablet-running-windows-8<on Oct. 31, 2013, (Jun. 4, 2012), 7 pages.
Yu, et al., "A New Driving Scheme for Reflective Bistable Cholesteric Liquid Crystal Displays", Retrived at <<http://www.ee.ust.hk/~eekwok/publications/1997/bcd_sid.pdf >> Proceedings of Society for Information Display International Symposium Digest of Technical Papers, May, 1997, pp. 4.
Bert, et al., "Passive Matrix Addressing of Electrophoretic Image Display", Retrieved at <<http://www.cmst.be/publi/eurodisplay2002_s14-1.pdf >> Proceedings of Conference on International Display Research Conference, Oct. 1, 2002. pp. 4.
"Accessing Device Sensors", retrieved from <https://developer.palm.com/content/api/dev-guide/pdk/accessing-device-sensors.html>on May 25, 2012, 4 pages.
"Microsoft Develops Glasses-Free Eye-Tracking 3D Display",*TechFAQ*, retrieved from <http://www.tech-faq.com/microsoft-develops-glasses-free-eye-tracking-3d-display.html> on Nov. 2, 2011, 3 pages.
"PCT Search Report and Written Opinion", Application No. PCT/US2013/028479, (Jun. 17, 2013),10 pages.

"Tilt Shift Lenses: Perspective Control", retrieved from http://www.cambridgeincolour.com/tutorials/tilt-shift-lenses1.htm, (Mar. 28, 2008), 11 Pages.
"Virtualization Getting Started Guide", *Red Hat Enterprise Linux 6*, Edition 0.2, retrieved from <http://docs.redhat.com/docs/en-US/Red_Hat_Enterprise_Linux/6/html-single/Virtualization_Getting_Started_Guide/index.html> on Jun. 13, 2012,24 pages.
Lee, C.M.G "Flat-Panel Autostereoscopic 3D Display", *Optoelectronics, IET*, Available at <http://ieeexplore.ieee.org/stamp/stamp.jsp?arnumber=04455550>,(Feb. 2008), pp. 24-28.
Schoning, Johannes et al., "Building Interactive Multi-Touch Surfaces", *Journal of Graphics, GPU, and Game Tools*, vol. 14, No. 3, available at <http://www.libavg.com/raw- attachment/wiki/Multitouch/Multitouchguide_draft.pdf>,(Nov. 2009), pp. 35-55.
"Final Office Action", U.S. Appl. No. 13/408,257, Mar. 28, 2014, 17 pages.
"Foreign Office Action", CN Application No. 201320328022.1, Feb. 17, 2014, 4 Pages.
"Foreign Office Action", CN Application No. 201320328022.1, Oct. 18, 2013, 3 Pages.
"Non-Final Office Action", U.S. Appl. No. 13/492,232, Apr. 30, 2014, 9 pages.
"Non-Final Office Action", U.S. Appl. No. 13/494,722, May 9, 2014, 8 pages.
"Restriction Requirement", U.S. Appl. No. 13/367,812, Mar. 11, 2014, 6 pages.
"Final Office Action", U.S. Appl. No. 13/647,507, Oct. 27, 2014, 33 pages.
"International Search Report and Written Opinion", Application No. PCT/US2014/020050, May 9, 2014, 10 pages.
"International Search Report and Written Opinion", Application No. PCT/US2014/016654, May 16, 2014, 11 pages.
"International Search Report and Written Opinion", Application No. PCT/US2013/075180, May 6, 2014, 12 pages.
"Non-Final Office Action", U.S. Appl. No. 13/367,812, Sep. 18, 2014, 10 pages.
"Non-Final Office Action", U.S. Appl. No. 13/408,257, Jul. 2, 2014, 20 pages.
"Non-Final Office Action", U.S. Appl. No. 13/647,507, Jun. 19, 2014, 22 pages.
"Non-Final Office Action", U.S. Appl. No. 13/773,496, Jun. 23, 2014, 10 pages.
"Final Office Action", U.S. Appl. No. 13/408,257, Dec. 10, 2014, 15 pages.
"Final Office Action", U.S. Appl. No. 13/492,232, Nov. 17, 2014, 13 pages.
"Final Office Action", U.S. Appl. No. 13/773,496, Nov. 4, 2014, 11 pages.
"Non-Final Office Action", U.S. Appl. No. 13/786,233, Nov. 20, 2014, 13 pages.
"Notice of Allowance", U.S. Appl. No. 13/494,722, Dec. 18, 2014, 7 pages.
"Written Opinion", Application No. PCT/US2014/020050, Sep. 22, 2014, 6 Pages.
"Advisory Action", U.S. Appl. No. 13/408,257, Apr. 8, 2015, 9 pages.
"Final Office Action", U.S. Appl. No. 13/786,233, May 27, 2015, 14 pages.
"Non-Final Office Action", U.S. Appl. No. 13/492,232, Feb. 24, 2015, 12 pages.
"Non-Final Office Action", U.S. Appl. No. 13/647,507, Feb. 9, 2015, 37 pages.
"Non-Final Office Action", U.S. Appl. No. 13/773,496, Jun. 8, 2015, 16 pages.
"Notice of Allowance", U.S. Appl. No. 13/367,812, Jan. 30, 2015, 8 pages.
"Notice of Allowance", U.S. Appl. No. 13/647,507, Jun. 3, 2015, 7 pages.
"Supplemental Notice of Allowance", U.S. Appl. No. 13/647,507, Jun. 30, 2015, 2 pages.
"Final Office Action", U.S. Appl. No. 13/492,232, Jul. 10, 2015, 11 pages.

(56) References Cited

OTHER PUBLICATIONS

"Foreign Office Action", CN Application No. 201310225788.1, Jun. 23, 2015, 14 Pages.
"Non-Final Office Action", U.S. Appl. No. 13/555,404, Aug. 17, 2015, 10 pages.
"Supplemental Notice of Allowance", U.S. Appl. No. 13/647,507, Jul. 16, 2015, 2 pages.
"Supplemental Notice of Allowance", U.S. Appl. No. 13/647,507, Aug. 27, 2015, 2 pages.
"Examiner's Answer to Appeal Brief", U.S. Appl. No. 13/408,257, Nov. 6, 2015, 23 pages.
"Final Office Action", U.S. Appl. No. 13/773,496, Oct. 29, 2015, 16 pages.
"Non-Final Office Action", U.S. Appl. No. 13/492,232, Dec. 17, 2015, 11 pages.
"Non-Final Office Action", U.S. Appl. No. 13/786,233, Sep. 29, 2015, 10 pages.
"Notice of Allowance", U.S. Appl. No. 13/555,404, Feb. 4, 2016, 9 pages.
"Final Office Action", U.S. Appl. No. 13/492,232, May 25, 2016, 12 pages.
"Non-Final Office Action", U.S. Appl. No. 13/773,496, Jun. 29, 2016, 17 pages.
"Restriction Requirement", U.S. Appl. No. 14/641,831, Jun. 14, 2016, 6 pages.
"Corrected Notice of Allowance", U.S. Appl. No. 13/555,404, May 2, 2016, 2 pages.
"Extended European Search Report", EP Application No. 13861059.7, Apr. 29, 2016, 8 page.
"Final Office Action", U.S. Appl. No. 13/786,233, May 5, 2016, 12 pages.
"Foreign Office Action", CN Application No. 201310225788.1, Feb. 29, 2016, 11 Pages.
"Foreign Office Action", CN Application No. 201380030964.4, Feb. 14, 2016, 11 pages.
"Supplemental Notice of Allowance", U.S. Appl. No. 13/555,404, Mar. 10, 2016, 2 pages.
Final Office Action, U.S. Appl. No. 13/492,232, May 25, 2016, 12 pages.
Non-Final Office Action, U.S. Appl. No. 13/773,496, Jun. 29, 2016, 17 pages.
Restriction Requirement, U.S. Appl. No. 14/641,831, Jun. 14, 2016, 6 pages.
Foreign Office Action, CN Application No. 201380030964.4, Sep. 1, 2016, 11 pages.
Foreign Office Action, CN Application No. 201310225788.1, Sep. 1, 2016, 8 pages.

\* cited by examiner

600 →

```
┌─────────────────────────────────────────────┐
│                    602                      │
│ Cause formation of an image for display via a display │
│ device by supplying a first voltage to a combined panel │
│ circuit of the display device, the first voltage sufficient to │
│ manipulate display particles of the display device to form │
│                  the image                  │
└─────────────────────────────────────────────┘
                      ↓
┌─────────────────────────────────────────────┐
│                    604                      │
│ Measure via the combined panel circuit capacitance │
│ associated with touch input at positions of the display │
│ device by selectively applying a second voltage to the │
│ combined panel circuit, the second voltage insufficient to │
│          manipulate the display particles           │
└─────────────────────────────────────────────┘
```

Fig. 6

COMBINED DISPLAY PANEL CIRCUIT

BACKGROUND

Touch capable display devices are becoming increasingly more common for computing devices including desktop devices, slate devices, e-reader devices, and mobile computing devices. Traditionally, functionality of a touch capable display to recognize touch input (e.g., a touch digitizer) and functionality to control images output by the display (e.g., display driver hardware) are provided by separate and distinct hardware (e.g., components, electronics, circuits, and/or controllers). Having separate hardware for recognition of touch input and control of displayed images complicates the design of display devices, increases cost, and/or may make it difficult to develop ultra-thin form factor computing devices that have become popular with consumers.

SUMMARY

Combined display panel circuit techniques are described herein. In one or more implementations, a combined panel circuit of a display device is configured to enable functionality for both recognition of touch inputs/gestures and functionality to update images output by the display device. This occurs without having to rely upon or include separate touch digitizer and display driver hardware. Consequently, construction of a display device having a dual-purpose combined panel circuit may be less complex, lower in cost, and/or the device may be made smaller (e.g., thinner).

The combined panel circuit, for instance, may include an electrode arrangement in conductive layers that sandwiches display particles used to form images for the display device. The display particles may be manipulated under the influence of a threshold voltage applied to the electrode arrangement that is sufficient to cause the display particles to transition between states. Sensing of capacitance indicative of touch inputs may occur under the influence of a different voltage that is not sufficient to manipulate the display particles. By selectively applying the different voltages at different times, the combined panel circuit may be operated to both update displayed images through manipulation of the display particles and sense capacitance to recognize touch inputs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 6 is a flow diagram depicting an example procedure to operate a combined panel circuit for display driving and sensing in accordance with one or more implementations.

DETAILED DESCRIPTION

Overview

Traditionally, functionality of a touch capable display to recognize touch input (e.g., a touch digitizer) and functionality to control images output by the display (e.g., display driver hardware) are provided by separate and distinct hardware, which may complicate design, increases cost, and make it difficult keep the display thin.

Combined display panel circuit techniques are described herein. In one or more implementations, a combined panel circuit of a display device is configured to enable functionality for both recognition of touch inputs/gestures and functionality to update images output by the display device. This occurs without having to rely upon or include separate touch digitizer and display driver hardware. Consequently, construction of a display device having a dual-purpose combined panel circuit may be less complex, lower in cost, and/or the device may be made smaller (e.g., thinner).

The combined panel circuit may include an electrode arrangement in conductive layers that sandwiches display particles used to form images for the display device. The display particles may be manipulated under the influence of a threshold voltage applied to the electrode arrangement that is sufficient to cause the display particles to transition between states. Sensing of capacitance indicative of touch inputs may occur under the influence of a different voltage that is not sufficient to manipulate the display particles. By selectively applying the different voltages at different times, the combined panel circuit may be operated to both update displayed images through manipulation of the display particles and sense capacitance to recognize touch inputs.

In the following discussion, an example environment is first described that is operable to employ the combined panel circuit techniques described herein. Example implementation details and procedures are then described, which may be employed in the example environment, as well as in other environments. Accordingly, the example details and procedures are not limited to the example environment and the example environment may incorporate details and procedures in addition to the examples described herein. Lastly, an example computing system is described that can be employed to implement combined panel circuit techniques in one or more embodiments.

Operating Environment

Figure 1:
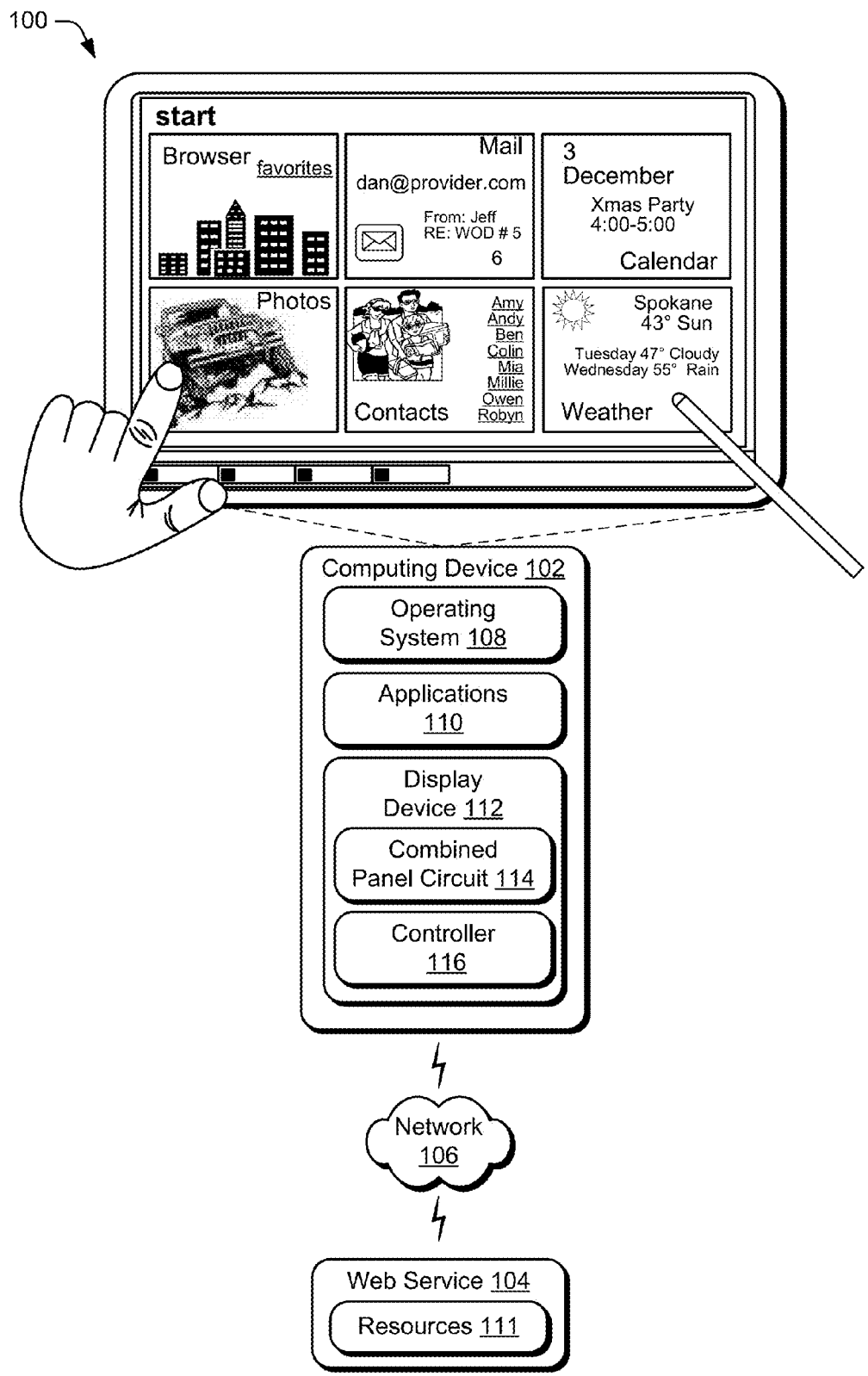
FIG. 1 is an illustration of an example environment that is operable to employ combined panel circuit techniques described herein.

FIG. 1 is an illustration of an environment 100 in an example implementation that is operable to employ techniques described herein. The illustrated environment 100 includes a computing device 102 and a web service 104 that are communicatively coupled via a network 106. The computing device 102 and the web service 104 may each be implemented by a wide range of computing devices.

For example, a computing device 102 may be configured as a computer that is capable of communicating over the network 106, such as a desktop computer, a mobile station, an entertainment appliance, a tablet or slate device, a set-top box communicatively coupled to a display device, a mobile communication device (e.g., a wireless phone), a game console, and so forth. The computing device 102 may be configured as any suitable computing system and/or device that employ various processing systems, some additional examples of which are discussed in relation to the example system of FIG. 7.

The computing device 102 is further illustrated as including an operating system 108. Generally speaking, the operating system 108 is configured to abstract underlying functionality of the computing device 102 to applications 110 that are executable on the computing device 102. For example, the operating system 108 may abstract processing, memory, network, and/or display functionality of the computing device 102 such that the applications 110 may be written without knowing "how" this underlying functionality is implemented. The application 110, for instance, may provide data to the operating system 108 to be rendered and displayed by the display device without understanding how this rendering will be performed. The operating system 108 may provide various services, interfaces, and functionality that the applications 110 may invoke to take advantage of system features. A variety of applications 110 to provide a wide range of functionality to the computing device 102 are contemplated including but not limited to a browser to access and render webpages and/or other content, an office productivity application, an email client, games, a multi-media management program, device management software, and social networking applications, to name a few examples. The operating system 108 and/or applications 110 may also be operable to interact with the web service 104 over the network to access various resources 111 (e.g., content and services) made available by the web service 104 further discussion of which may also be found within the discussion of the example system of FIG. 7.

In the depicted example, the computing device 102 includes or makes use of a display device 112 that may be configured as a touchscreen to enable touchscreen and gesture functionality. The computing device 102 may therefore include a display driver, an input module, and/or other modules operable to provide touchscreen and gesture functionality enabled by the display device 112. Accordingly, the computing device may be configured to recognize touch input and gestures (including touch input from a user's finger, a stylus, or other suitable input tool) that cause corresponding operations to be performed. This includes recognition and processing of input using various input mechanisms such as touch input, stylus input, a camera, and so forth.

For example, an input module may be implemented as component of the operating system 108 or otherwise. The input module may be configured to recognize a touch input, such as a finger of a user's hand as on or proximate to the display device 112 of the computing device 102 using touchscreen functionality. The input module may also be configured to recognize a variety of different types of gestures including, by way of example and not limitation, gestures that are recognized from a single type of input (e.g., touch gestures) as well as gestures involving multiple types of inputs. For example, gestures supported by the computing device may include single-finger gestures and bezel gestures, multiple-finger/same-hand gestures and bezel gestures, and/or multiple-finger/different-hand gestures and bezel gestures, to name a few examples. Further, the operating system 108 and/or input module may be configured to detect and differentiate between gestures, touch inputs, camera-based input, stylus input, and other different types of inputs. Moreover, various kinds of inputs obtained from different sources, including inputs obtained through a touch-screen, a mouse, touchpad, a camera, software or hardware keyboard, and/or hardware keys of a device (e.g., input devices), may be used individually and/or in different combinations to cause corresponding device operations.

The display device 112 may be configured as an integrated component of the computing device 102 as shown, as a standalone display that may be communicatively coupled to the computing device 102 by way of a suitable interface, as an add-on component, and so forth. In accordance with techniques described above and below, the display device 112 may be configured to include a combined panel circuit 114 and a controller 116. As discussed in greater detail below, the combined panel circuit 114 represents a common hardware operable to both drive the display device 112 to control image output (e.g., set/switch displayed images) and sense capacitance to recognize touch inputs, stylus inputs, or other suitable input applied to the display device 112. This is in contrast to traditional techniques, which may separate functionally for display driving and touch digitizing and therefore may employ multiple different circuits and/or distinct components to implement the functionally. The controller 116 represents functionality to operate the combined panel circuit 114. This may include implementing different modes of the combined panel circuit 114 to selectively switch between driving the display and sensing capacitance. In at least some embodiments, transitions of the combined panel circuit 114 between driving and sensing modes may be controlled by applying different respective voltages corresponding to the different modes. Details regarding these and other aspects of combined display panel circuit techniques are discussed in relation to the following example procedures.

Having described an example operating environment, consider now a discussion of some example implementation details in accordance with one or more implementations.

Combined Display Panel Circuit Details

Figure 2:
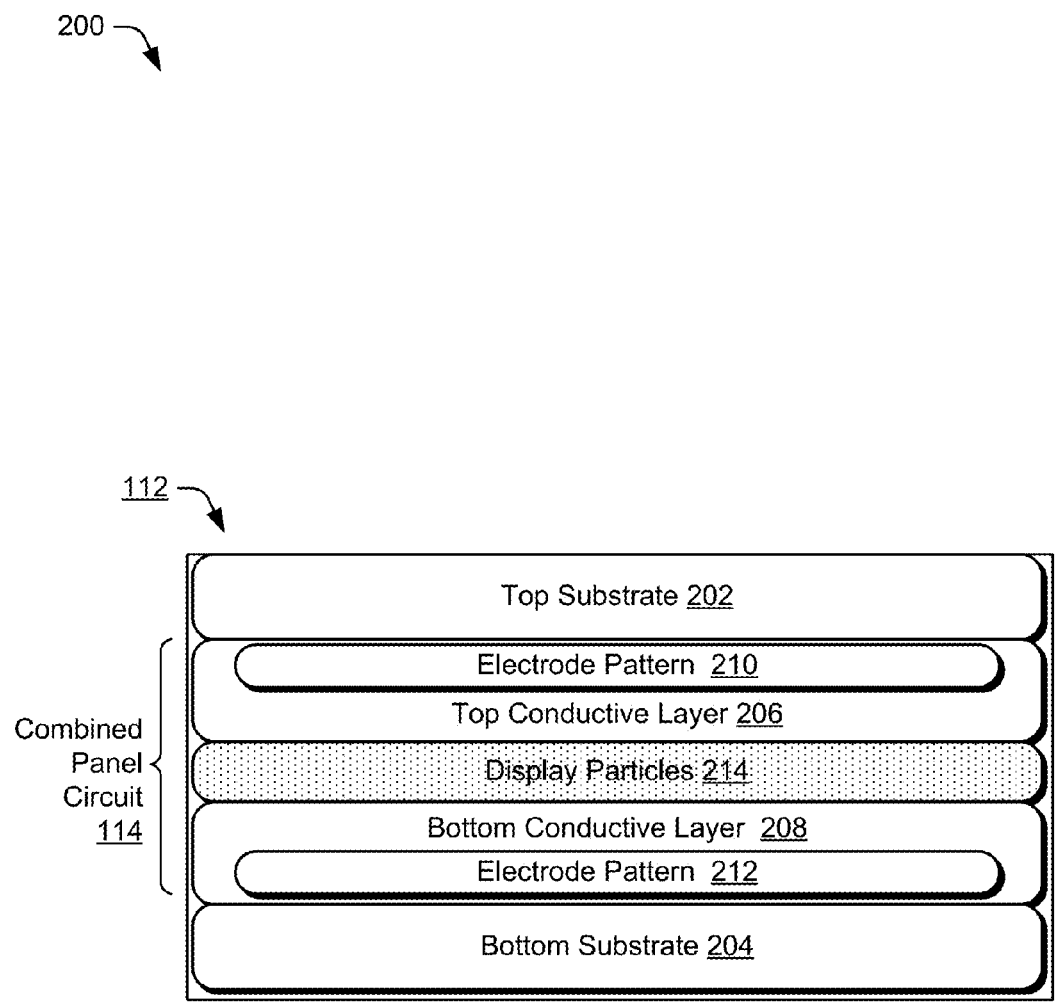
FIG. 2 depicts details of an example combined panel circuit in accordance with one or more implementations.

To further illustrate, consider now FIG. 2, which depicts generally at 200 an example cross sectional representation of example layers of a display device 112. In the example arrangement, the display device is depicted as having a combined panel circuit 114 that is disposed between a top substrate layer 202 and a bottom substrate layer 204. The substrate layers may be composed of glass, plastic, metal or another suitable substrate material.

As further represented in FIG. 2, the combined panel circuit 114 may include multiple layers to form a common circuit that may be used for both driving the display and sensing capacitance. In the example arrangement, the layers include a top conductive layer 206 and a bottom conductive layer 208, which may be configured to implement electrode pattern 210 and electrode pattern 212, respectively. Display particles 214 are sandwiched in between the conductive layer 206 and bottom conductive layer 208. In operation, a voltage is applied across the electrode pattern 210 and electrode pattern 212. In one voltage range or level, the combined panel circuit 114 may operate in a sensing mode to detect capacitance. At another, different voltage range or level, the combined panel circuit 114 may operate in display driving mode to manipulate the display particles to form images. In particular, the controller 116 may be configured to cause different voltage signals and levels (e.g., voltage waveforms) to be applied to the combined panel circuit 114 to implement the different modes and selectively switch between the modes.

For instance, the controller may implement a control scheme to toggle back and forth between a sensing mode and a display driving mode at a designated time interval. In sensing mode, the controller 116 may be configured to scan the electrode pattern to detect capacitance across the circuit that is indicative of inputs (e.g., touch, gestures, stylus input, etc.). In display driving mode, the controller 116 may be configured to transmit voltage signals to the electrode pattern that cause changes to the display particles to form a corresponding image.

In this manner, the combined panel circuit enables functionality to both detect inputs/gestures and to update images output by the display device. This occurs without having to rely upon or include separate touch digitizer and display driver circuits and componentry. Consequently, construction of the display device 112 may be less complex, cost to build the display may be reduced, and/or the device may be made smaller (e.g., thinner) since the combined panel circuit is configured for dual purposes.

Various conductive materials may be used for the conductive layers and electrode patterns. By way of example and not limitation, conductive materials may include but are not limited to indium tin oxide (ITO), copper, silver, and Poly(3,4-ethylenedioxythiophene) (PEDOT), to name a few examples. The electrode pattern 210 and electrode pattern 212 are representative of various electrode arrangements that may be employed in different implementations. In one approach, the pattern is configured as horizontally and vertically oriented control lines (relative to the display surface, e.g., screen) that form an x-y control line grid across the display.

By way of example, the electrode pattern 210 may be formed as horizontal control lines the run across the display (e.g., parallel to an x-axis of the display) and the electrode pattern 212 may be formed as vertical control lines that run perpendicular to the horizontal control lines (e.g., parallel to a y-axis of the display). In this arrangement, intersections of control lines arranged within the layers of the combined panel circuit may correspond to pixels of the display. Moreover, the intersections of control lines also correspond to points of the display at which touch input, gestures, and the like may be sensed.

Figure 3:
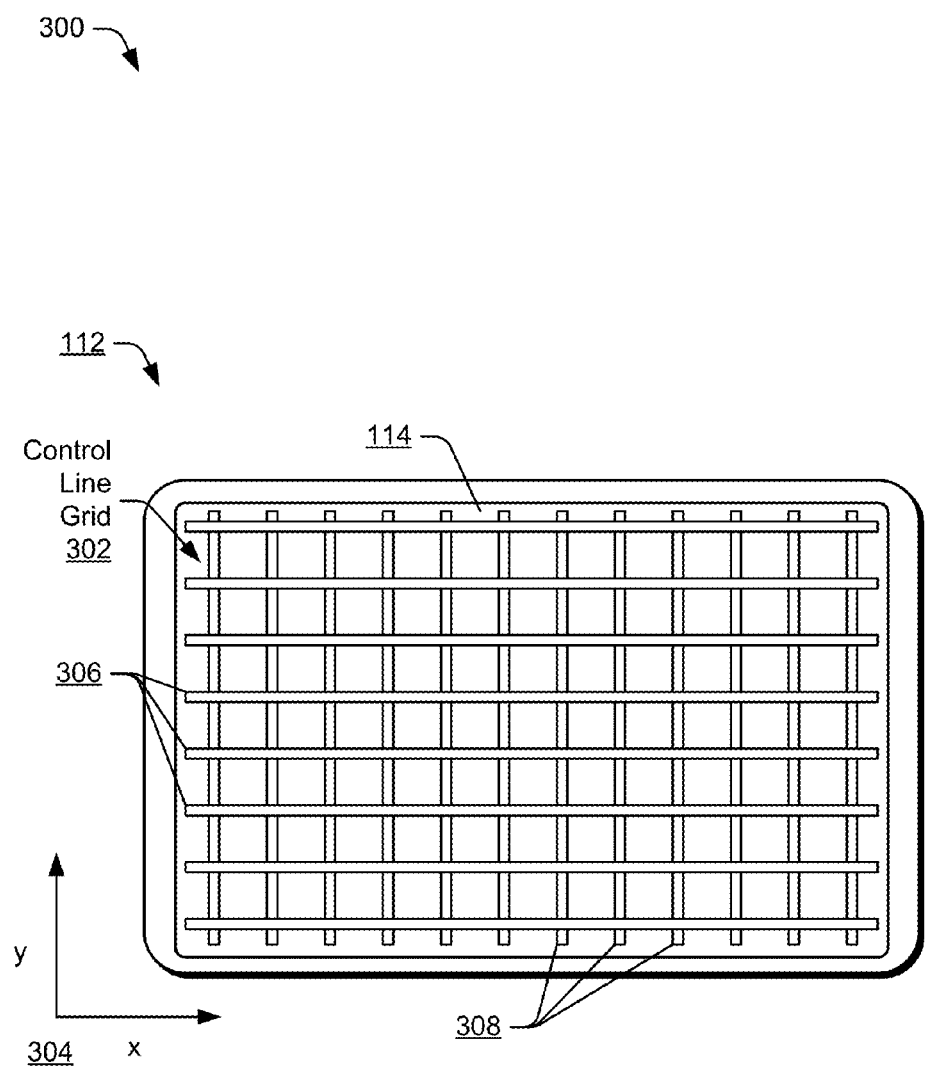
FIG. 3 depicts an example electrode arrangement configured as a grid of control lines.

FIG. 3 depicts generally at 300 a diagram that represent an example control line grid 302 that may be incorporated within a combined panel circuit 114 in one or more implementations of a display device 112. In this example, the control line grid 302 is oriented relative to an x-y coordinate system 304 defined for the display device 112. In particular, horizontal control lines 306 run parallel to the x-axis and vertical control lines 308 run along the y-axis. The horizontal control lines 306 and vertical control lines 308 may correspond to the electrode pattern 210 and electrode pattern 212 of FIG. 2, respectively. Thus, the control line grid 302 may be formed within multiple conductive layers of the combined panel circuit 114. Generally, one of the electrode patterns 210, 212 (and/or layers) may be configured as cathodes for the circuit and the other one of the electrode patterns 210, 212 may be configured as anodes for the circuit.

Although, an x-y grid of electrodes as just described may be employed in some implementations, it is to be appreciated that this arrangement is provided as but one illustrative example. A variety of electrode patterns suitable to drive a display and detect input are contemplated, some additional examples of which include a diagonal pattern, alternating horizontal and vertical lines in the conductive layers, a spiral pattern, and/or other complex electrode patterns.

In addition, the display device may be configured using a variety of technologies and corresponding display particles 214. The techniques described herein a particularly suited for use with passive matrix displays and electrophoretic displays. In one or more implementations the display particles 214 may be bi-stable material capable of changing between states in response to applied voltage and holding the state between refreshes of the display. Thus, images may be formed by applying voltage to points in the control line grid 302 (or other electrode arrangement) to cause a rearrangement of the display particles for pixels corresponding to the points in the grid. In one approach, pigmented particles may migrate between the conductive layers at each pixel position to switch the color that appears at the pixel (e.g., black or white). Other types of bi-stable particles may be configured to switch between two or more colors under the influence of applied voltage. An e-reader device that incorporates an electrophoretic display is one example of a computing device 102 that may utilize the combined panel circuit techniques described herein. The described techniques may also be suitable for segmented displays, passive matrix LCD devices, and/or other display device that makes use of a passive matrix and/or bi-stable materials.

As noted, the controller 116 may operate the combined panel circuit 114 in both a sensing mode and a display driving mode. Generally, suitable display particles 214 have a threshold switching voltage at which the particles transition between states. The controller 116 may therefore be configured to use a difference between the switching voltage at which particles respond and voltage at which capacitance may be sensed to toggle between the modes. At one voltage level or range, capacitive sensing may occur in the sensing mode. At another, different voltage level or range, the display particles respond and therefore the display may be refreshed in the display driving mode to update displayed images.

In one approach, the display particles 214 may be associated with a relatively high switching voltage. By way of example and not limitation, the switching voltage may be in the range of approximately 20 volts to 120 volts. At applied voltages less than the switching voltage, the display particles 214 do not respond to cause a change in the displayed image of the display device 112. As such, under the influence of a relatively low sensing voltage, capacitive sensing may occur via the combined circuit panel without disturbing the image being displayed by the display device 112. By way of example and not limitation, the sensing voltage may be in the range of approximately 5 volts to 60 volts, depending upon the particular switching voltage of the display particles used by the device. Thus, the display driving mode may be associated with a particular threshold voltage that is relatively higher than a lower sensing voltage applied to implement a sensing mode that does not use voltage sufficient to cause a change in the display.

In addition or alternatively, display particles 214 may be selected that are configured to respond and/or switch states in response to a relatively low voltage applied for a sufficient dwell time. In this case, a low voltage applied for the dwell time may be used to drive display change in the display driving mode and a relatively higher voltage applied in a burst (e.g., less time than the dwell time) may be used to implement the sensing mode. In this implementation, the display driving mode is associated with a voltage that is lower that the voltage used for the sensing mode. Other combinations of different voltage levels, ranges, and dwell times suitable to selectively switch between a display driving mode and a sensing mode are also contemplated.

Figure 4:
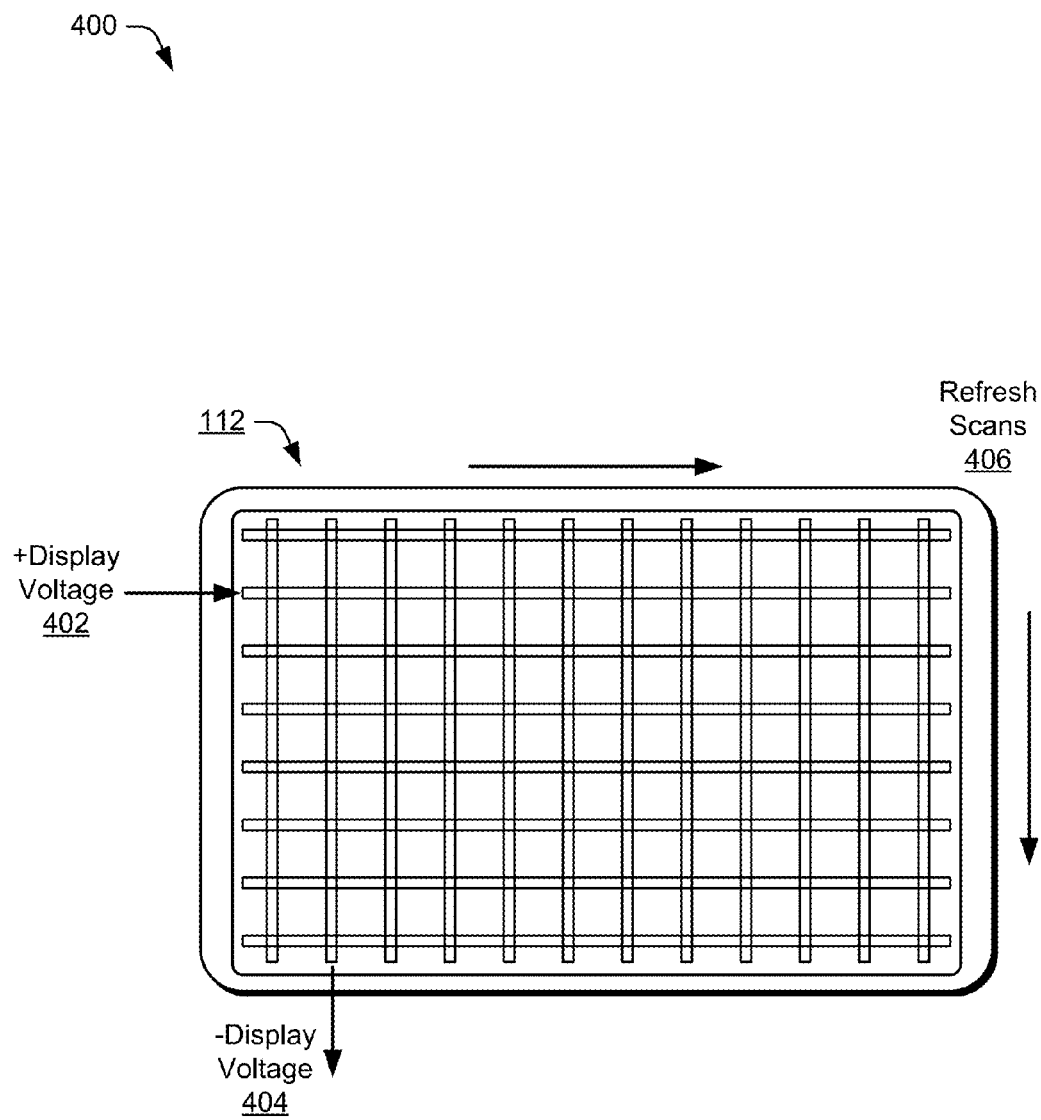
FIG. 4 is a diagram representing operation of a combined panel circuit in a display driving mode.

In the context of the foregoing discussion, consider now FIG. 4 which depicts generally at 400 an example implementation of a display driving mode for a display device 112. Here, the display device 112 includes a combined panel circuit 114 having a control line grid 302 as described in relation to FIG. 3. To implement, the display driving mode, input display voltage 402 associated with the display driving mode is applied to horizontal rows of the control line grid 302 and output display voltage 404 may be returned via the vertical columns of the control line grid 302. Voltage applied across the grid may be sufficient to update display particles at particular x-y coordinates associated with the grid. The controller 116 may perform refresh scans 406 across the grid to manipulate the display particles 214 at pixel positions one by one to set and update images presented via the display screen. In this example, the input display voltage 402 may correspond to a threshold voltage at which display particles 214 respond, such as approximately +90 volts.

Figure 5:
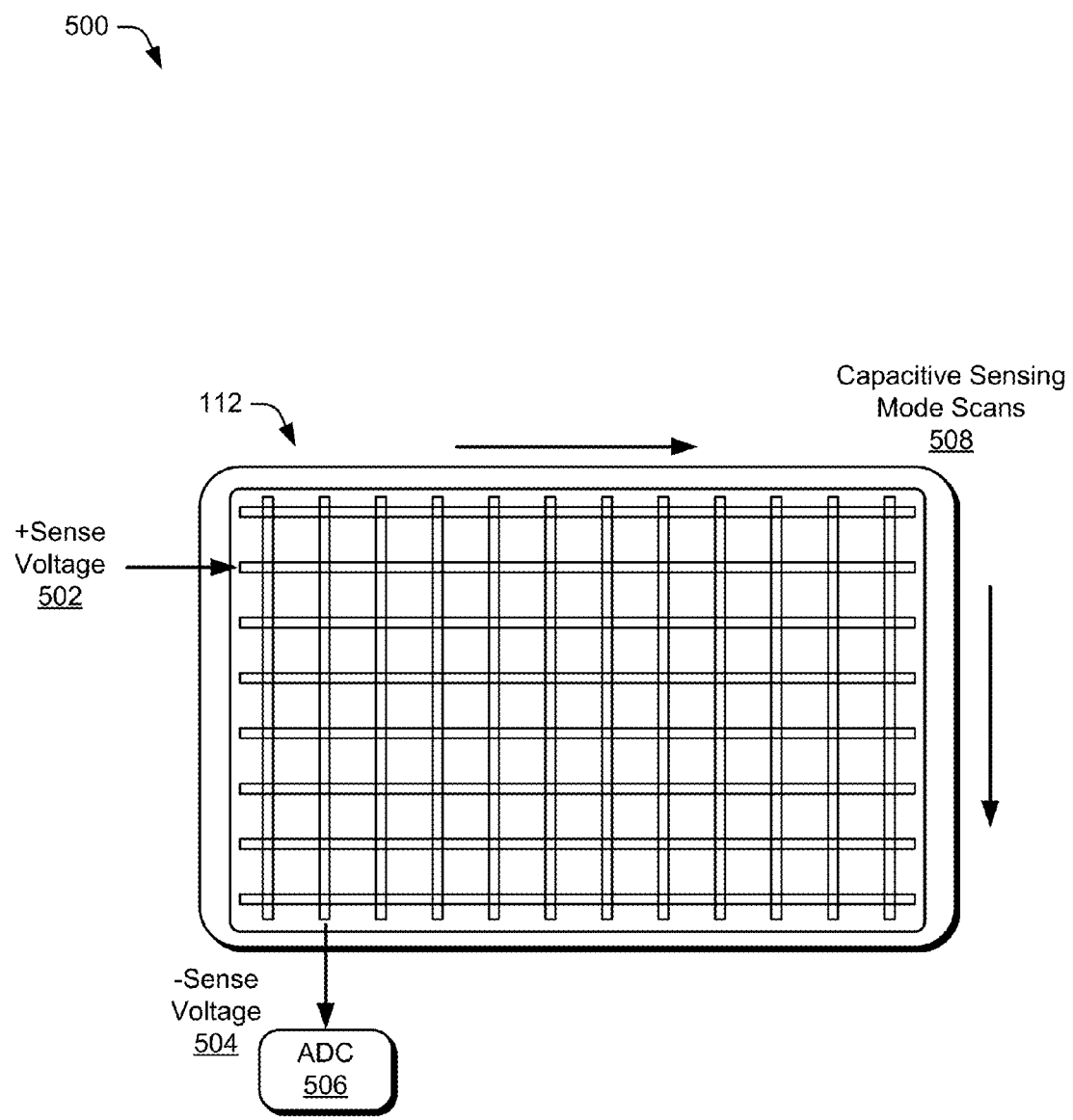
FIG. 5 is a diagram representing operation of a combined panel circuit in a sensing mode.

Likewise, FIG. 5 depicts generally at 500 an example implementation of a sensing mode for a display device 112. To implement, the sensing mode, input sense voltage 502 associated with the sensing mode is applied to horizontal rows of the control line grid 302 and output sense voltage 504 may be returned/monitored via the vertical columns of the control line grid 302. Changes in capacitance across the grid may occur based upon positioning of as user's finger, as stylus or another input tool on or proximate to the display surface. These changes in capacitance may be measured via the vertical columns of the control line grid and supplied to an analog to digital converter 506 as shown in FIG. 5 to produce digital data for recognition of corresponding touch inputs and/or gestures.

Thus, the controller 116 may perform sense scans 508 across the grid to measure capacitance changes at pixel positions one by one to recognize touch inputs (e.g., finger touches, gestures, stylus taps, etc.). In this example, the input sense voltage 502 may correspond to a relatively low voltage, such as approximately +5 volts. The input sense voltage 502 is set at less than the threshold voltage for updating the display. Thus, the input sense voltage 502 is not sufficient to activate the display particles 214 and/or cause changes to images presented by the display device.

Having considered the foregoing example details of combined panel circuit techniques, consider now a discussion of an example procedure in accordance with one or more implementations.

Example Procedure

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the foregoing example operating environment and implementation details described in relation to FIGS. 1 to 5.

FIG. 6 depicts an example procedure 600 in which a combined circuit panel is employed for both updating a display and touch input sensing. In at least some embodiments, the procedure may be performed by a suitably configured controller device, such as the controller 116 of FIG. 1 implemented as a component of a display device 112.

Formation of an image for display via a display device is caused by supplying a first voltage to a combined panel circuit of the display device, the first voltage sufficient to manipulate display particles of the display device to form the image (block 602). For example, a display device 112 may include a combined panel circuit 114 and a controller 116 as previously described. The combined panel circuit 114 may include a control line grid 302, an x-y matrix, or other electrode arrangement suitable to operate the combined panel circuit in different modes under the influence of different applied voltages. Moreover, the electrode arrangement may be configured in conductance layers that sandwich display particles 214. In some implementations, the electrode arrangement forms a passive matrix for driving the display. Additionally, the display particles 214 may be bi-stable particles that may be toggled between states at individual pixel positions that correspond to locations within the matrix (e.g., x-y positions of the grid). The display particles 214 may be activated and respond to a threshold voltage level. The controller 116 may implement a control scheme, which may apply the threshold voltage level to refresh an image that is displayed via the combined panel circuit 114. The threshold voltage level is sufficient to manipulate the display particles 214 to set different colors for the pixel positions and thereby form an image. The manipulation may include causing the display particles 214 to migrate between a cathode side and anode side of the combined panel circuit, switching the display particles between different colors, or otherwise setting states of the display particles to form an image.

Capacitance associated with touch input at positions of the display device is measured via the combined panel circuit by selectively applying as second voltage to the combined circuit panel, the second voltage insufficient to manipulate the display particles (block 604). As mentioned previously, a sensing mode for a combined circuit panel 114 may implemented via a controller by application of appropriate voltage. The voltage that is applied to implement the sensing mode is sufficient to sense capacitance across positions of the display device, but is insufficient to manipulate the display particles. For instance, the voltage for sensing may be less than a threshold voltage used to refresh the image presented by the display. The capacitance measured at x-y position of a grid or location within another suitable electrode arrangement is also indicative of touch input (e.g., finger touches, gestures, stylus input, etc.) that is produced through interaction with the display device. Accordingly, measurement of the capacitance may enable recognition of touch input and/or initiation of various actions corresponding to recognized touch input. In this manner, a controller 116 may selectively operate a combined panel circuit 114 in both a display driving mode and a sensing mode.

Having considered example procedures, consider now an example system that may be employed in one or more embodiments to implement aspects of combined panel circuit techniques described herein.

Example System

Figure 7:
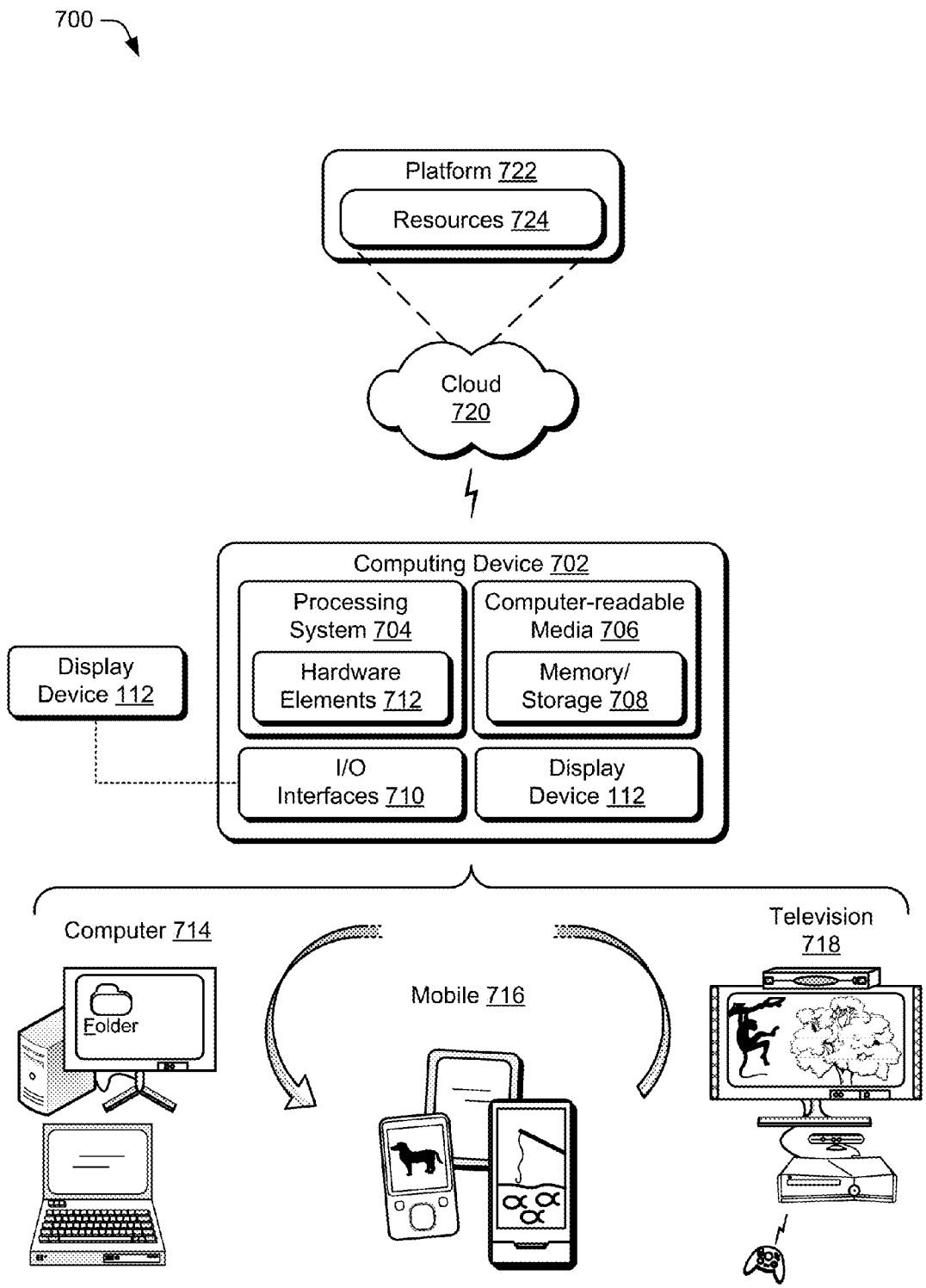
FIG. 7 illustrates various components of an example system that can be employed to implement aspects of the techniques described herein.

FIG. 7 illustrates an example system generally at 700 that includes an example computing device 702 that is representative of one or more computing systems and/or devices that may implement the various techniques described herein. The computing device 702 may be, for example, a server of a service provider, a device associated with the client (e.g., a client device), an on-chip system, and/or any other suitable computing device or computing system. The computing device may include or make use of a display device 112 as described herein. The display device 112 may be provided as an integrated display or an external display that is connectable to the computing device 702 by way of a suitable I/O interface. The display device 112 may be configured to implement a combined panel circuit 114 as described above and previously.

The example computing device 702 includes a processing system 704 that may incorporate one or more processors or processing devices, one or more computer-readable media 706 which may include one or more memory and/or storage components 708, and one or more input/output (I/O) interfaces 710 for input/output (I/O) devices. Computer-readable media 706 and/or one or more I/O devices may be included as part of, or alternatively may be coupled to, the computing device 702. As illustrated, the processing system 704 may also include one or more hardware elements 712 representative of functionality to implement at least some aspects of the procedures and techniques described herein in hardware. Although not shown, the computing device 702 may further include a system bus or data transfer system that couples the various components one to another. A system bus can include any one or combination of different bus structures, such as a memory bus or memory controller, a peripheral bus, a universal serial bus, and/or a processor or local bus that utilizes any of a variety of bus architectures.

The processing system 704, processors, and hardware elements 712 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 608 represents memory/storage capacity associated with one or more computer-readable media. The memory/storage component 608 may include volatile media (such as random access memory (RAM)) and/or nonvolatile media (such as read only memory (ROM), Flash memory, optical disks, magnetic disks, and so forth). The memory/storage component 608 may include fixed media (e.g., RAM, ROM, a fixed hard drive, etc.) as well as removable media (e.g., a Flash memory drive, a removable hard drive, an optical disk, and so forth).

Input/output interface(s) 710 allow a user to enter commands and information to computing device 702, and also allow information to be presented to the user and/or other components or devices using various input/output devices. Examples of input devices include a keyboard, a cursor control device (e.g., a mouse), a microphone for audio/voice input, a scanner, a camera, and so forth. Examples of output devices include a display device 112 (e.g., a monitor or projector), speakers, a printer, a network card, and so forth.

Various techniques may be described herein in the general context of software, hardware, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processing systems, hardware elements, computer-readable media and/or memory/storage components.

An implementation of the described modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable storage of information in contrast to mere signal transmission, carrier waves, or signals per se. Thus, computer-readable storage media does not include transitory media or signals per se. The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Hardware elements 712 are representative of instructions, modules, programmable device logic and/or fixed device logic implemented in a hardware form that may be employed in some embodiments to implement at least some aspects of the described techniques. Hardware elements may include components of an integrated circuit or on-chip system, an application-specific integrated circuit (ASIC), a field-programmable gate array (FPGA), a complex programmable logic device (CPLD), and so forth. In this context, a hardware element may operate as a processing device that performs program tasks defined by instructions, modules, and/or logic embodied by the hardware element.

Combinations of the foregoing may also be employed to implement various techniques and modules described herein. Accordingly, software, hardware, or program modules, including controller 116, applications 110, operating system 108 and other program modules may be implemented as one or more instructions and/or logic embodied on some form of computer-readable media and/or by one or more hardware elements 712. The computing device 702 may be configured to implement particular instructions and/or functions corresponding to the software and/or hardware modules. The instructions and/or functions may be executable/operable by one or more articles of manufacture (for example, one or more computing devices 702 and/or processing systems 704) to implement techniques, modules, and example procedures described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on. The techniques described herein may be supported by these various configurations of the computing device 702 and are not limited to the specific examples the techniques described herein.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of the functionality described herein may be distributed throughout the system 700. For example, the functionality may be implemented in part on the computing device 702 as well as via the platform 722 that abstracts the functionality of the cloud 720.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A display device comprising a combined panel circuit operable to perform both capacitive sensing responsive to application of a first voltage to a grid of control lines and updating of an image displayed by the display device responsive to application of a second voltage to the same grid of control lines to which the first voltage was applied, the combined panel circuit comprising a top conductive layer and a bottom conductive layer which are configured to implement a first electrode pattern and a second electrode pattern, respectively, across which the first voltage and the second voltage are applied, the first voltage and the second voltage applied at different times and at different voltage levels.

2. A display device as recited in claim 1, further comprising a controller to selectively apply the first voltage and the second voltage.

3. A display device as recited in claim 2, wherein the controller is configured to apply the first voltage and the second voltage according to a control scheme to switch back and forth between a sensing mode when the first voltage is applied and a display driving mode when the second voltage is applied.

4. A display device as recited in claim 1, wherein the display device is configured as a passive matrix display.

5. A display device as recited in claim 1, wherein the electrode patterns correspond to pixel positions of the display device.

6. A display device as recited in claim 5, wherein each of the electrode patterns comprise an x-y matrix of control lines formed within the conductive layers of the combined panel circuit.

7. A display device as recited in claim 1, wherein the combined panel circuit includes display particles arranged between the conductive layers of the combined panel circuit, the display particles manipulable under applied voltage to form images for display via the display device.

8. A display device as recited in claim 7, wherein the display particles are bistable particles configured to switch between states at a threshold voltage.

9. A display device as recited in claim 8, wherein the second voltage corresponds to the threshold voltage and is sufficient to manipulate the display particles to cause the updating of the image displayed by the display device.

10. A display device as recited in claim 1, wherein the first voltage is insufficient to manipulate display particles to change an image displayed via the display device.

11. A display device as recited in claim 1, wherein the capacitive sensing enables recognition of touch inputs at positions of the display device by measuring capacitance at corresponding locations of the combined panel circuit.

12. A display device as recited in claim 1, wherein the display device is as external display device connectable to a computing device via an input/output interface.

13. A display device as recited in claim 1, wherein the display device is an integrated component of a computing device.

14. A method implemented by a controller of a display device comprising:
 causing formation of an image for display via the display device by supplying a first voltage to a grid of control lines of a combined panel circuit of the display device, the first voltage sufficient to manipulate display particles of the display device to form the image, wherein the display particles are arranged between conductive layers of the combined panel circuit; and
 measuring via the combined panel circuit capacitance associated with touch input at positions of the display device by selectively applying a second voltage to the same grid of control lines of the combined panel circuit which received the first voltage, the first voltage and the second voltage applied at different times and having different voltage levels, the second voltage sufficient to sense capacitance across positions of the display device but insufficient to manipulate the display particles, the combined panel circuit comprising a top conductive layer and a bottom conductive layer which are configured to implement a first electrode pattern and a second electrode pattern, respectively, across which the first voltage and the second voltage are applied.

15. A method as described in claim 14, wherein the display particles comprise bistable particles, and wherein the conductive layers are configured to toggle between states when the first voltage is applied.

16. A method as described in claim 14, wherein the combined panel circuit comprises an x-y matrix of control lines having intersections that correspond to pixel positions of the display device.

17. A method as described in claim 14, wherein the first voltage is higher than the second voltage.

18. A computing device comprising an integrated display device including:
 a single combined panel circuit configured to implement both a sensing mode to measure capacitance at positions of the display device and a display driving mode to rearrange display particles corresponding to the positions to control images displayed via the display device, the combined panel circuit comprising a top conductive layer and a bottom conductive layer which are configured to implement a first electrode pattern and a second electrode pattern, respectively, across which a first voltage and a second voltage are applied; and
 a controller to selectively switch between the sensing mode and the display driving mode by applying the first voltage to a matrix of control lines and the second voltage to the same matrix of control lines of the combined panel circuit at different times and at different voltage levels.

19. A computing device as described in claim 18, wherein the first voltage is a threshold voltage for the display driving mode that is sufficient to cause the display particles to transition between states and the second voltage is a sensing voltage for the sensing mode that is lower than the threshold voltage and insufficient to cause the display particles to transition between the states.

20. A computing device as described in claim 18, wherein the integrated display device is configured as an electrophoretic display.

* * * * *